United States Patent
Layouni et al.

(10) Patent No.: US 12,406,574 B2
(45) Date of Patent: Sep. 2, 2025

(54) METHODS FOR ENHANCING EFFICIENCY OF SECURE VEHICLE TO EVERYTHING (V2X) STREAM COMMUNICATION

(71) Applicant: GM Global Technology Operations LLC, Detroit, MI (US)

(72) Inventors: Mohamed A. Layouni, Fraser, MI (US); Vivek Vijaya Kumar, Shelby Township, MI (US); Xiaoguang Huang, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 18/495,908

(22) Filed: Oct. 27, 2023

(65) Prior Publication Data
US 2025/0140107 A1  May 1, 2025

(51) Int. Cl.
G08G 1/01     (2006.01)
H04W 4/44     (2018.01)
H04W 4/46     (2018.01)

(52) U.S. Cl.
CPC ............ G08G 1/0141 (2013.01); H04W 4/44 (2018.02); H04W 4/46 (2018.02)

(58) Field of Classification Search
CPC ........ G08G 1/0141; H04W 4/44; H04W 4/46; H04W 4/40
See application file for complete search history.

(56) References Cited

U.S. PATENT DOCUMENTS

| 9,020,771 | B1* | 4/2015 | Hardy | B60L 3/0069 |
| | | | | 702/65 |
| 2019/0186948 | A1* | 6/2019 | Hayee | B60Q 9/00 |
| 2023/0007453 | A1 | 1/2023 | Higuchi et al. | |
| 2023/0059897 | A1 | 2/2023 | Miucic et al. | |

FOREIGN PATENT DOCUMENTS

DE  102021113836 A1  12/2021

* cited by examiner

*Primary Examiner* — Azizul Choudhury
(74) *Attorney, Agent, or Firm* — Vivacqua Crane, PLLC

(57) ABSTRACT

A system for enhancing efficient of vehicle to everything (V2X) stream communication includes transmitting and receiving vehicles. Sensors capture information about the transmitting and receiving vehicles, and capture environmental information about an environment of the transmitting and receiving vehicles. Each vehicle has a controller that executes an application for enhancing V2X stream communication (EVSC). The EVSC obtains, from the sensors, transmitting and receiving vehicle information and environmental information. The EVSC actively and continuously engages a sparse signing approach (SSA) and a chained packet approach (CPA) portion of the EVSC to monitor bandwidth utilization and computational resource utilization for the transmitting and receiving vehicle information and environmental information, and to actively and continuously reduce bandwidth and computational resource utilization from a first level to a second level less than the first level while ensuring security of V2X communications.

20 Claims, 4 Drawing Sheets

METHODS FOR ENHANCING EFFICIENCY OF SECURE VEHICLE TO EVERYTHING (V2X) STREAM COMMUNICATION

INTRODUCTION

The present disclosure relates to vehicle-to-everything (V2X) communications, and more specifically to methods of enhancing efficiency of secure V2X communication. Current V2X communications and hardware standards are designed to accommodate a predefined quantity of protected communication throughput. Additionally, as advanced driver assistance systems (ADAS) are becoming more ubiquitous, so too is the quantity of V2X data being transmitted on V2X networks that needs to be protected. Accordingly, throughput of communications is increasing with the increase in V2X network usage.

While current systems and methods for sending and receiving data on V2X networks achieve their intended purpose, there is a need for a new and improved system and method for enhancing the efficiency of secure V2X communications while maintaining or improving security of the data transmitted on such V2X networks while maintaining or improving ADAS functionality, improving V2X throughput, and improving user experience without increasing system complexity or latency.

SUMMARY

According to several aspects of the present disclosure a system for enhancing efficient of vehicle to everything (V2X) stream communication includes one or more transmitting vehicles and one or more receiving vehicles. The system further includes one or more sensors capturing vehicle information about the transmitting vehicles and the receiving vehicles and capturing environmental information about an environment of the one or more transmitting vehicles and the one or more receiving vehicles. Each of the one or more transmitting vehicles and the one or more receiving vehicles has a controller. The controller includes a processor, a memory, and one or more input/output (I/O) ports, the I/O ports are in communication with the one or more sensors. The memory stores programmatic control logic. The processor executes the programmatic control logic, including an application for enhancing V2X stream communication (EVSC). The EVSC includes at least first, second, third, and fourth control logics. The first control logic obtains, from the one or more sensors, transmitting and receiving vehicle information and environmental information. The second control logic engages a sparse signing approach (SSA) portion of the EVSC. The third control logic engages a chained packet approach (CPA) portion of the EVSC. The fourth control logic actively and continuously engages the SSA and CPA portions to monitor bandwidth utilization and computational resource utilization and to actively and continuously reduce bandwidth and computational resource utilization from a first level to a second level less than the first level while ensuring security of V2X communications.

In an additional aspect of the present disclosure first control logic further includes control logic for obtaining vehicle telematics information including speed, location, altitude, bandwidth utilization, computational resource utilization from sensors including: sensors disposed on the one or more transmitting vehicles and on the one or more receiving vehicles. The first control logic further includes control logic for obtaining traffic information, road condition and road surface information, weather information, and position information from sensors including: sensors on infrastructure including global positioning system (GPS) satellites, cellular towers, and traffic signaling devices.

In yet another aspect of the present disclosure the second control logic further includes control logic for identifying regular V2X messages including: vehicle heading, vehicle speed, vehicle location, and vehicle altitude; and control logic for identifying intermediate V2X messages including messages from autonomous applications including advanced driver assistance system (ADAS) communications.

In still another aspect of the present disclosure regular V2X messages are sent and received on a standard message interval that is regular and periodic, and intermediate messages are sent and received at a higher frequency than the standard message interval.

In yet another aspect of the present disclosure the second control logic further includes control logic for securely signing regular V2X messages, and control logic for selectively signing intermediate V2X messages by: tracking behavior of transmitting vehicles and receiving vehicles by actively and continuously monitoring the intermediate V2X messages, and upon determining that a dramatic dynamic change is occurring or that a special command has been sent, securely signing the intermediate V2X messages corresponding to the dramatic dynamic change or the special command.

In still another aspect of the present disclosure, the second control logic further includes control logic that causes receiving vehicles to track and generate predictions of transmitting vehicles since a previous securely signed V2X message was received. Upon receiving an unsecured V2X message, the second control logic verifies the information contained in the unsecured V2X message by comparing the information in the unsecured V2X message to the predictions, and upon determining that the unsecured V2X message matches the predictions, the second control logic increases a confidence level from a first level to a second level greater than the first level. Confidence levels define automotive safety integrity level (ASIL) ratings. The receiving vehicle signs and secures unsecured V2X messages having ASIL ratings equal to or greater than a threshold ASIL rating.

In yet another aspect of the present disclosure, a baseline threshold ASIL rating is ASIL-B; and the threshold ASIL rating is selectively modified based on vehicle information about the transmitting vehicles and the receiving vehicles and environmental information including: traffic information, road condition and road surface information, weather information, and position information.

In still another aspect of the present disclosure the third control logic further includes control logic that causes receiving vehicles to buffer unsigned intermediate V2X messages that are received between a signed regular V2X message and a signed subsequent regular V2X message; and control logic that causes transmitting vehicles to append a hash of each V2X message to subsequent V2X messages within an interval between the signed regular V2X message and signed subsequent regular V2X message.

In yet another aspect of the present disclosure the third control logic further includes control logic that verifies unsigned intermediate V2X messages based on a valid signature of the subsequent regular V2X message and a hash of the signed subsequent regular V2X message; and control logic that batch authenticates one or more unsigned V2X messages in the interval via the hash of the signed subsequent regular V2X message.

In still another aspect of the present disclosure the EVSC operates actively and continuously while the receiving vehicle is in operation; and the SSA and CPA portions run selectively to actively and continuously reduce bandwidth and computational resource utilization from the first level to the second level by: executing control logic to operate the SSA when a quantity of V2X messages being transmitted and received within a predefined period of time is equal to or below a predetermined threshold quantity; and executing control logic to operate the CPA while the quantity of V2X messages being transmitted and received within the predefined period of time is greater than the predetermined threshold quantity.

In yet another aspect of the present disclosure the EVSC operates actively and continuously while the receiving vehicle is in operation; and the SSA and CPA portions run selectively to actively and continuously reduce bandwidth and computational resource utilization from the first level to the second level by: executing control logic to operate the SSA portion to manage V2X messages identified as urgent through the ASIL ratings of the V2X messages being transmitted and received within a predefined period of time; and executing control logic to operate the CPA portion to manage V2X messages identified as non-urgent via the ASIL ratings of the V2X messages being transmitted and received within the predefined period of time.

According to several further aspects of the present disclosure a method for enhancing efficient of vehicle to everything (V2X) stream communication includes capturing, via one or more sensors, vehicle information about one or more transmitting vehicles and one or more receiving vehicles, and capturing environmental information about an environment of the one or more transmitting vehicles and the one or more receiving vehicles. Each of the one or more transmitting vehicles and the one or more receiving vehicles has a controller, the controller including a processor, a memory, and one or more input/output (I/O) ports. The I/O ports are in communication with the one or more sensors. The memory stores programmatic control logic. The processor executes the programmatic control logic, including an application for enhancing V2X stream communication (EVSC). The EVSC includes control logic for: obtaining, from the one or more sensors, transmitting and receiving vehicle information and environmental information, engaging a sparse signing approach (SSA) portion of the EVSC, engaging a chained packet approach (CPA) portion of the EVSC, and actively and continuously engaging the SSA and CPA portions to monitor bandwidth utilization and computational resource utilization and actively and continuously reducing bandwidth and computational resource utilization from a first level to a second level less than the first level while ensuring security of V2X communications.

In an additional aspect of the present disclosure, the method further includes obtaining vehicle telematics information including speed, location, altitude, bandwidth utilization, computational resource utilization from sensors comprising: sensors disposed on the one or more transmitting vehicles and on the one or more receiving vehicles, and obtaining traffic information, road condition and road surface information, weather information, and position information from sensors comprising: sensors on infrastructure including global positioning system (GPS) satellites, cellular towers, and traffic signaling devices.

In still another aspect of the present disclosure the method further includes identifying regular V2X messages including: vehicle heading, vehicle speed, vehicle location, and vehicle altitude, identifying intermediate V2X messages including messages from autonomous applications including advanced driver assistance system (ADAS) communications, and sending and receiving regular V2X messages on a standard message interval that is regular and periodic, and sending and receiving intermediate V2X messages at a higher frequency than the standard message interval.

In yet another aspect of the present disclosure the method further includes securely signing regular V2X messages, and selectively securely signing intermediate V2X messages by: tracking behavior of transmitting vehicles and receiving vehicles by actively and continuously monitoring the intermediate V2X messages; and upon determining that a dramatic dynamic change is occurring or that a special command has been sent, securely signing the intermediate V2X messages corresponding to the dramatic dynamic change or the special command.

In still another aspect of the present disclosure the method further includes causing receiving vehicles to track and generate predictions of transmitting vehicles since a previous securely signed V2X message was received. Upon receiving an unsecured V2X message, the method verifies the information contained in the unsecured V2X message by comparing the information in the unsecured V2X message to the predictions. Upon determining that the unsecured V2X message matches the predictions, the method increases a confidence level from a first level to a second level greater than the first level, and wherein confidence levels define automotive safety integrity level (ASIL) ratings, and wherein the receiving vehicle signs and secures unsecured V2X messages having ASIL ratings equal to or greater than a threshold ASIL rating. A baseline threshold ASIL rating is ASIL B. The method further includes selectively modifying the threshold ASIL rating based on vehicle information about the transmitting vehicles and the receiving vehicles and environmental information including: traffic information, road condition and road surface information, weather information, and position information.

In yet another aspect of the present disclosure the method further includes causing receiving vehicles to buffer unsigned intermediate V2X messages that are received between a signed regular V2X message and a signed subsequent regular V2X message; and causing transmitting vehicles to append a hash of each V2X message to subsequent V2X messages within an interval between the signed regular V2X message and signed subsequent regular V2X message. The method further includes verifying unsigned intermediate V2X messages based on a valid signature of the subsequent regular V2X message and a hash of the signed subsequent regular V2X message, and batch authenticating one or more unsigned V2X messages in the interval via the hash of the signed subsequent regular V2X message.

In still another aspect of the present disclosure the method further includes operating the EVSC actively and continuously while the receiving vehicle is in operation; and selectively running the SSA and CPA portions to actively and continuously reduce bandwidth and computational resource utilization from the first level to the second level by: executing the SSA when a quantity of V2X messages being transmitted and received within a predefined period of time is equal to or below a predetermined threshold quantity; and executing the CPA while the quantity of V2X messages being transmitted and received within the predefined period of time is greater than the predetermined threshold quantity.

In yet another aspect of the present disclosure the method further includes operating the EVSC actively and continuously while the receiving vehicle is in operation; and selectively running the SSA and CPA portions to actively and continuously reduce bandwidth and computational resource utilization from the first level to the second level by: executing the SSA portion to manage V2X messages identified as urgent through the ASIL ratings of the V2X messages being transmitted and received within a predefined period of time; and executing the CPA portion to manage V2X messages identified as non-urgent via the ASIL ratings of the V2X messages being transmitted and received within the predefined period of time.

In several additional aspects of the present disclosure a method for enhancing efficient of vehicle to everything (V2X) stream communication includes capturing, via one or more sensors, vehicle information about one or more transmitting vehicles and one or more receiving vehicles, and capturing environmental information about an environment of the one or more transmitting vehicles and the one or more receiving vehicles. Each of the one or more transmitting vehicles and the one or more receiving vehicles have a controller. The controller includes a processor, a memory, and one or more input/output (I/O) ports. The I/O ports are in communication with the one or more sensors. The memory stores programmatic control logic. The processor executes the programmatic control logic, including an application for enhancing V2X stream communication (EVSC). The EVSC includes control logic for: obtaining, from the one or more sensors, vehicle telematics information including speed, location, altitude, bandwidth utilization, computational resource utilization from sensors including: sensors disposed on the one or more transmitting vehicles and on the one or more receiving vehicles. The EVSC further includes control logic for obtaining traffic information, road condition and road surface information, weather information, and position information from sensors including: sensors on infrastructure including global positioning system (GPS) satellites, cellular towers, and traffic signaling devices. The EVSC further includes control logic for engaging a sparse signing approach (SSA) portion of the EVSC, including: identifying regular V2X messages including: vehicle heading, vehicle speed, vehicle location, and vehicle altitude; identifying intermediate V2X messages including messages from autonomous applications including advanced driver assistance system (ADAS) communications; sending and receiving regular V2X messages on a standard message interval that is regular and periodic, and sending and receiving intermediate V2X messages at a higher frequency than the standard message interval; securely signing regular V2X messages, and selectively securely signing intermediate V2X messages by: tracking behavior of transmitting vehicles and receiving vehicles by actively and continuously monitoring the intermediate V2X messages. Upon determining that a dramatic dynamic change is occurring or that a special command has been sent, securely signing the intermediate V2X messages corresponding to the dramatic dynamic change or the special command, and causing receiving vehicles to track and generate predictions of transmitting vehicles since a previous securely signed V2X message was received. Upon receiving an unsecured V2X message, the SSA portion of the EVSC verifies the information contained in the unsecured V2X message by comparing the information in the unsecured V2X message to the predictions. Upon determining that the unsecured V2X message matches the predictions, the SSA portion of the EVSC increases a confidence level from a first level to a second level greater than the first level. Confidence levels define automotive safety integrity level (ASIL) ratings. The receiving vehicle signs and secures unsecured V2X messages having ASIL ratings equal to or greater than a threshold ASIL rating. A baseline threshold ASIL rating is ASIL B. The SSA portion of the EVSC further includes control logic for selectively modifying the threshold ASIL rating based on vehicle information about the transmitting vehicles and the receiving vehicles and environmental information including: traffic information, road condition and road surface information, weather information, and position information. The EVSC further includes control logic for engaging a chained packet approach (CPA) portion of the EVSC, including: control logic that causes receiving vehicles to buffer unsigned intermediate V2X messages that are received between a signed regular V2X message and a signed subsequent regular V2X message, and causes transmitting vehicles to append a hash of each V2X message to subsequent V2X messages within an interval between the signed regular V2X message and signed subsequent regular V2X message. The CPA portion of the EVSC further includes control logic for verifying unsigned intermediate V2X messages based on a valid signature of the subsequent regular V2X message and a hash of the signed subsequent regular V2X message, and for batch authenticating one or more unsigned V2X messages in the interval via the hash of the signed subsequent regular V2X message. The EVSC further includes control logic for actively and continuously engaging the EVSC to monitor bandwidth utilization and computational resource utilization and actively and continuously reducing bandwidth and computational resource utilization while ensuring security of V2X communications while the receiving vehicle is in operation by: selectively running the SSA and CPA portions to actively and continuously reduce bandwidth and computational resource utilization from a first level to the second level less than the first level by: executing the SSA when a quantity of V2X messages being transmitted and received within a predefined period of time is equal to or below a predetermined threshold quantity, and executing the CPA while the quantity of V2X messages being transmitted and received within the predefined period of time is greater than the predetermined threshold quantity. The EVSC further includes control logic for selectively running the SSA and CPA portions to actively and continuously reduce bandwidth and computational resource utilization from the first level to the second level by: executing the SSA portion to manage V2X messages identified as urgent through the ASIL ratings of the V2X messages being transmitted and received within a predefined period of time; and executing the CPA portion to manage V2X messages identified as non-urgent via the ASIL ratings of the V2X messages being transmitted and received within the predefined period of time.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
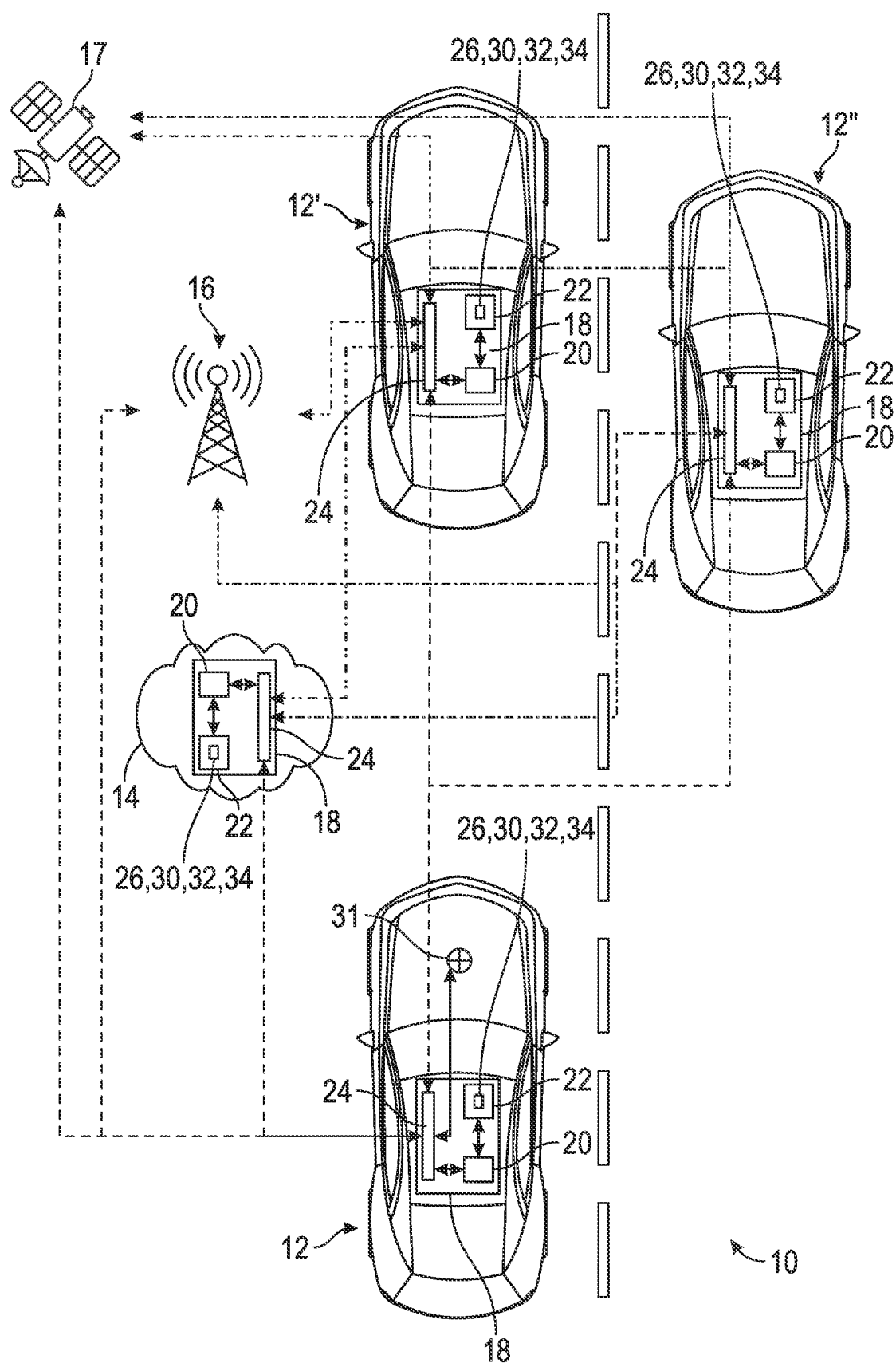
FIG. 1 is a schematic diagram of a system for enhancing efficiency of secure vehicle to everything (V2X) stream communication according to an exemplary embodiment.

Referring to FIG. 1, a system 10 for enhancing efficiency of secure vehicle-to-everything (V2X) stream communications is shown in schematic form. The system 10 includes one or more vehicles 12, a back-office or cloud-computing server 14, and may further include infrastructure, such as one or more cellular towers 16, Global Positioning System (GPS) satellites 17, traffic signaling devices (not specifically shown), and the like. While the vehicle 12 shown is a passenger car, the vehicle 12 may be any of a wide variety of vehicle 12 types without departing from the scope or intent of the present disclosure. The vehicle 12 may be any of a wide variety of vehicles including cars, trucks, sport-utility vehicles (SUVs), buses, semi-tractors, tractors used in farming or construction or the like, watercraft, aircraft such as planes or helicopters, or the like. More specifically, the system 10 includes at least two vehicles 12, such as a receiving vehicle and one or more transmitting vehicles 12', 12".

The one or more vehicles 12, 12', 12" and the cloud computing server 14 each include one or more controllers 18. The controllers 18 are non-generalized, electronic control devices having a preprogrammed digital computer or processor 20, non-transitory computer readable medium or memory 22 used to store data such as control logic, software applications, instructions, computer code, data, lookup tables, etc., and a transceiver or input/output (I/O) ports 24. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 22 excludes wired, wireless, optical, or other communication links that transport transitory electrical or other signals. A non-transitory computer readable memory 22 includes media where data can be permanently stored and media where data can be stored and later overwritten, such as a rewritable optical disc or an erasable memory device. Computer code includes any type of program code, including source code, object code, and executable code. The processor 20 is configured to execute the code or instructions. In vehicles 12, the controller 18 may be a dedicated Wi-Fi controller or an engine control module, a transmission control module, a body control module, an infotainment control module, etc. The I/O ports 24 are configured to wirelessly communicate using Wi-Fi protocols under IEEE 802.11x, cellular protocols such as global system for mobile communications (GSM), code division multiple access (CDMA), wireless in local loop (WLL), general packet radio services (GPRS), 1G, 2G, 3G, 4G long term evolution (LTE), 5G, or the like.

The memory 22 may store one or more applications 26. An application 26 is a software program configured to perform a specific function or set of functions. The application 26 may include one or more computer programs, software components, sets of instructions, procedures, functions, objects, classes, instances, related data, or a portion thereof adapted for implementation in a suitable computer readable program code. The applications 26 may be stored within the memory 22 of the on-board controllers 18 in the vehicles 16, or in additional or separate memory, such as within a memory 22 of a cloud computing device such as the cloud computing server 14. Examples of the applications 26 include audio or video streaming services, games, browsers, social media, and an application for enhancing efficiency of secure V2X stream communication 28. Hereinafter, for the sake of simplicity and to improve clarity, the application for enhancing efficiency of V2X stream communication 28 is referred to hereinafter as the efficiency enhancing of V2X stream communication application (EVSC) 30.

Vehicles 12 acquire operational data from a variety of sources including, but not limited to one or more sensors 31 disposed on the vehicles 12 and capturing vehicle 12 information including vehicle 12 telematics information and communications information such as vehicle 12 speed, vehicle 12 location information, vehicle 12 altitude, vehicle 12 communications bandwidth utilization information, vehicle 12 computational resource utilization information, and the like. In further examples, the vehicles 12 acquire environmental data about the area surrounding the one or more vehicles 12, such as traffic condition information, road condition and road surface information, weather information, and the like from remote sensor 31 sources, such as sensors 31 of infrastructure including GPS satellites 17, cellular towers 16, traffic signaling devices (not specifically shown), and the like.

In many aspects, vehicle-to-everything (V2X) transmissions are increasingly ubiquitous in modern vehicles 12. Because the data transmitted and received via V2X transmissions often includes data that implicates safety and security concerns, V2X transmissions utilize standardized security protocols under, for example, IEEE 1609.2. Wireless Access in Vehicular Environments (WAVE) Security Services support the generation of secured data payloads, as well, but securing the data payloads is often time consuming and computationally complex. While some types of messages, such as basic safety messages (BSMs) may comfortably utilize WAVE, or similar because of the need to transmit a maximum of 10 messages per second, or low-throughput data, other types of transmissions may require additional resources. In several aspects, BSMs and other such "regular" V2X messages may include a variety of data including, but not limited to: vehicle 12 heading, vehicle 12 speed, vehicle 12 location information, vehicle 12 altitude, and the like. Vehicles 12 receiving regular V2X messages make some assumptions about the transmitting vehicle's 12', 12" movements, such as the relative location, attitude, motion, road maneuvering status, or likely paths of the transmitting vehicles 12', 12" relative to the receiving vehicle 12. By contrast, autonomous applications such as advanced driver assistance system (ADAS)-equipped vehicles 12 may generate significant quantities of information and significant quantities of V2X messages, utilizing significant computational and communications resources to secure, which may result in increased latency and reduced performance.

The EVSC 30 reduces latency and improves performance over existing solutions by operating in at least two distinct manners that do not require changes to preexisting hardware. Accordingly, the EVSC 30 does not require the utilization of hardware with additional computational or data transmission capabilities, relative to the hardware currently in existence on vehicles 12, 12', 12", within the cloud computing server 14, and/or within the infrastructure such as cellular towers 16, traffic signaling devices and the like. More specifically, the controller 18 executes the EVSC 30 in a sparse signing approach (SSA) 32 and in a chained packet approach (CPA) 34.

Figure 2:
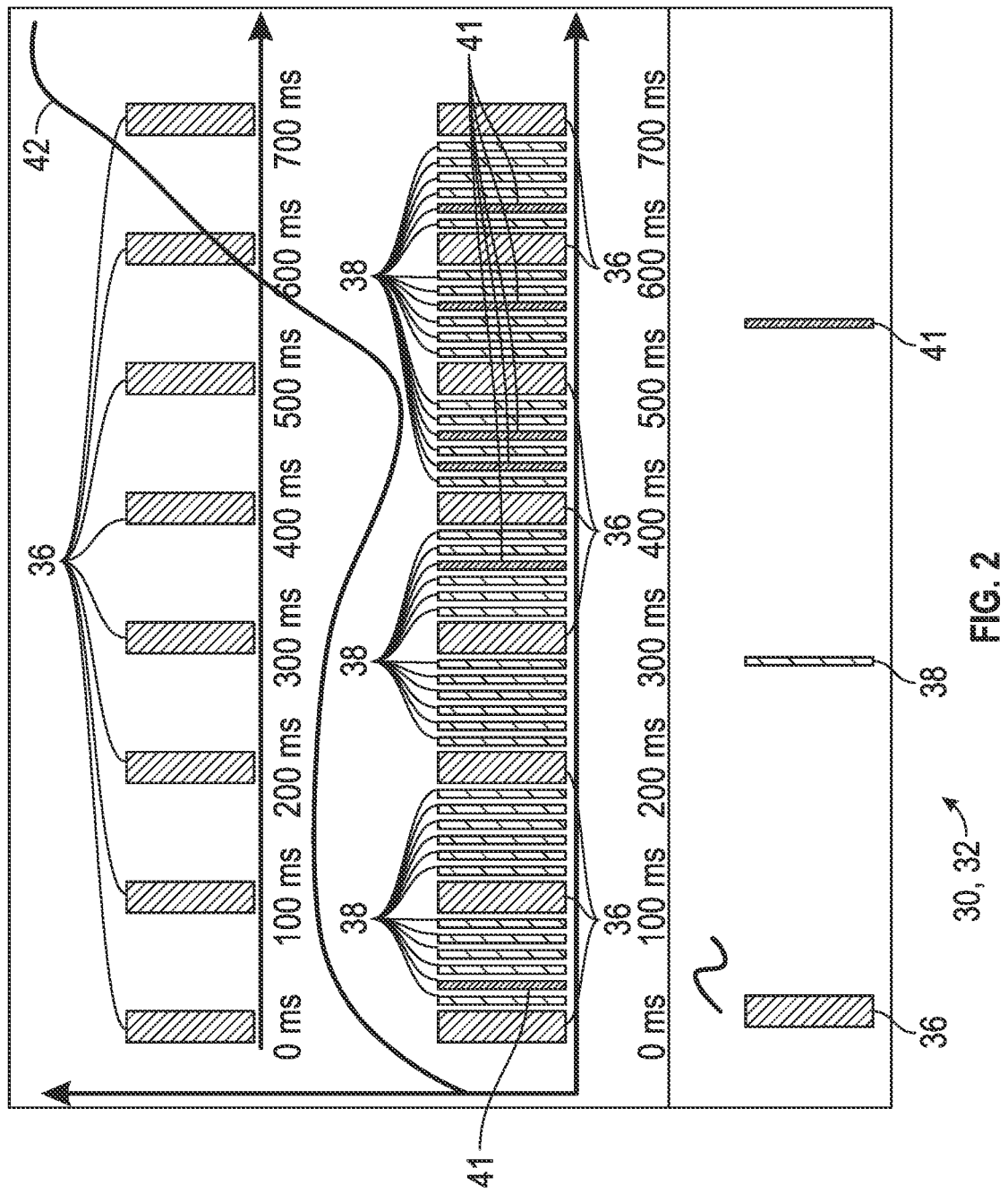
FIG. 2 is a graphical representation of a series of V2X messages transmitted over time of a system for enhancing efficiency of secure V2X stream communication according to an exemplary embodiment.

Turning now to FIG. 2 and with continuing reference to FIG. 1 the SSA 32 approach of the EVSC 30 is shown in further detail in a graphical representation of V2X transmissions. Along the X-axis is an exemplary time-scale extending from 0ms to 700 ms. Wide bars define V2X data packet transmissions to and from the vehicle 12, 12', 12" that include safety data. In several aspects the safety data of the wide bars defines BSMs 36 or BSM-like message that may or may not be transmitted less frequency. By contrast, narrow bars depict ADAS application 38 V2X data packets 40, and the curved trend line 42 defines a trace of vehicle 12, 12', 12" dynamics. By virtue of the varieties of data contained in BSMs 36, BSM 36 data packets are securely transmitted. Typical BSM 36 data packets are used in a variety of on-vehicle 12, 12', 12" and remotely stored and executed applications. BSM 36 data packets are transmitted at a standardized broadcast frequency which may vary, but is typically ten (10) times per second, or 10 Hz, to surrounding vehicles 12', 12" with a variety of data content that is used in safety applications, ADAS functions, and the like. The standard frequency of the BSM 36 data packet transmissions is indicated in FIG. 2 by the even spacing of the wide bars. Additionally, the BSM 36 transmissions are indicated as being secured by virtue of the dark shading of the associated bars. By comparison the light shading of most of the narrow bars indicates that the V2X data packets 40 for ADAS applications 38 are un-secured transmissions.

It will be appreciated that ADAS applications 38 are computationally complex and generate and cause the transmission of significant quantities of data. Likewise, in order to function for their intended purpose, ADAS application 38 V2X data packet 40 transmissions are made at a frequency greater than 10 Hz so that ADAS-equipped vehicles 12 are effectively enabled to perform real-time dynamic actions as the ADAS-equipped vehicles 12 are operated. The increased frequency of ADAS applications 38 is depicted by the greater than 10 Hz frequency of the ADAS application 38 data packet 40 transmissions in FIG. 2. It should be noted, however, that ADAS applications 38 do generate safety critical messages or data packets 40 that should be secured. However, due to the high frequency and volume of such data, not all of the ADAS application 38 data packet 40 transmissions in FIG. 2 may be secured in the sense that the system 10 may not be capable of securing a high volume of messages or may introduce unwanted latency in doing so. In some examples, the content of some or all of the higher than 10 Hz frequency transmissions may be missed or otherwise fail to be read and utilized by systems not capable of capturing such high-frequency messages. Accordingly, the EVSC 30 utilizes the SSA 32 and CPA 34 approaches to properly capture, read, and utilize the data incorporated in high-frequency messages that are distributed between BSMs 36.

Specifically, a transmitting vehicle 12', 12" utilizes the SSA 32 portion of the EVSC 30 to identify standard (i.e. BSM 36) and intermediate message intervals based on autonomous or ADAS applications 38 data packet 40 transmissions. The transmitting vehicle 12', 12" then tracks behavior between standard messages. The transmitting vehicle 12', 12" subsequently identifies events when intermediate messages should be secured. In some examples, the SSA 32 determines that intermediate messages should be secured in high dynamics situations 41 where the transmitting vehicle 12', 12" is commanding or is executing a dramatic dynamic change such as a full-throttle acceleration, a high brake force deceleration, a sudden lane change, or the like. In further examples, the intermediate messages 41 should be secured when the intermediate messages define special commands to other vehicles 12 such as following vehicles 12. Other types of intermediate messages 41 not specifically defined herein may also be secured for a variety of purposes without departing from the scope or intent of the present disclosure.

Receiving vehicles 12 utilize the EVSC 30 to track and predict changes in the transmitting vehicles' 12', 12" information since a previous securely signed or secured V2X message was received. Upon receiving an unsecured message, the receiving vehicles 12 verify the information based on a prediction from a previous time step. Receiving vehicles 12 then increase a confidence level in the unsecured data from a first level to a second level greater than the first when secured data subsequently received from the transmitting vehicles 12', 12" closely matches the receiving vehicle 12 prediction. To determine whether the prediction closely matches the secured data from the transmitting vehicles 12', 12", a metric may be defined that measures a distance between the predicted state and actual state. The metric is a weighted sum of components including but not limited to: the percentage difference between predicted speed and actual speed, predicted acceleration and actual acceleration, predicted path and actual path, and the like. The percentage difference between predicted and actual paths may be computed as a ratio of area between the predicted and actual paths to an area of a portion of road travelled by the vehicle 12 during the measurement period 48. The receiving vehicles 12 do not utilize data from unsecured messages or packets when the confidence level is below a predefined threshold value. It will be appreciated that the predefined threshold value may vary from application to application, or the like. In some examples, the threshold value may be defined as an Automotive Safety Integrity Level (ASIL) rating. ASIL ratings, identified by ISO 26262 are defined as A, B, C, and D ratings, where ASIL A represents a lowest degree and ASIL D represents a highest degree of automotive hazard. For instance, systems like airbags, anti-lock brakes, and power steering typically require an ASIL-D grade which imparts a highest level of rigor to safety assurance because risks associated with such systems are regarded as highest. By contrast, components like rear lights typically require only an ASIL-A grade, while headlights and brake lights generally require an ASIL-B grade and normal (i.e. non-ADAS) cruise control would fall under ASIL-C. It will be appreciated that the ASIL-A through ASIL-D gradations of the exemplary systems noted above may vary without departing from the scope or intent of the present disclosure.

In several aspects, the SSA 32 portion of the EVSC 30 may utilize static rules to determine which data transmissions or packets received from transmitting vehicles 12', 12" should be signed. For example, transmissions or packets having an ASIL rating greater than or equal to a predetermined threshold confidence value of ASIL-B must be signed, while those with an ASIL rating less than ASIL-B should not be signed. In other examples, the SSA 32 portion of the EVSC 30 may utilize dynamic, flexible rules that take context into account before determining whether a packet should be signed. For example, when the receiving vehicle 12 and transmitting vehicles 12', 12" are on a major roadway or highway at a peak traffic time of day, then all packets may be assigned a rating of greater than or equal to ASIL-B. By contrast, when the receiving vehicle 12 and transmitting vehicles 12', 12" are on the same stretch or roadway or highway at an off-peak time of day, the dynamic, flexible rules may be relaxed by signing only the most critical packets, i.e. packets rated greater than or equal to ASIL C, or D, situationally. By only signing a subset of transmissions or packets received, a frequency of initiating security services to sign packets is substantially reduced. In examples in which the data transmissions or packets define ADAS applications 38, the frequency of data packet 40 transmissions may meet or exceed 100 Hz. Accordingly, even if the system 10 is capable of signing every packet transmitted, the amount of time necessary to sign each packet would cause increased transmission latency. Thus, the SSA 32 portion of the EVSC 30 reduces transmission latency by only signing a subset of the packets sent and received while ensuring that performance of the receiving vehicle 12 is unaffected by unsecured messages or packets.

Figure 3:
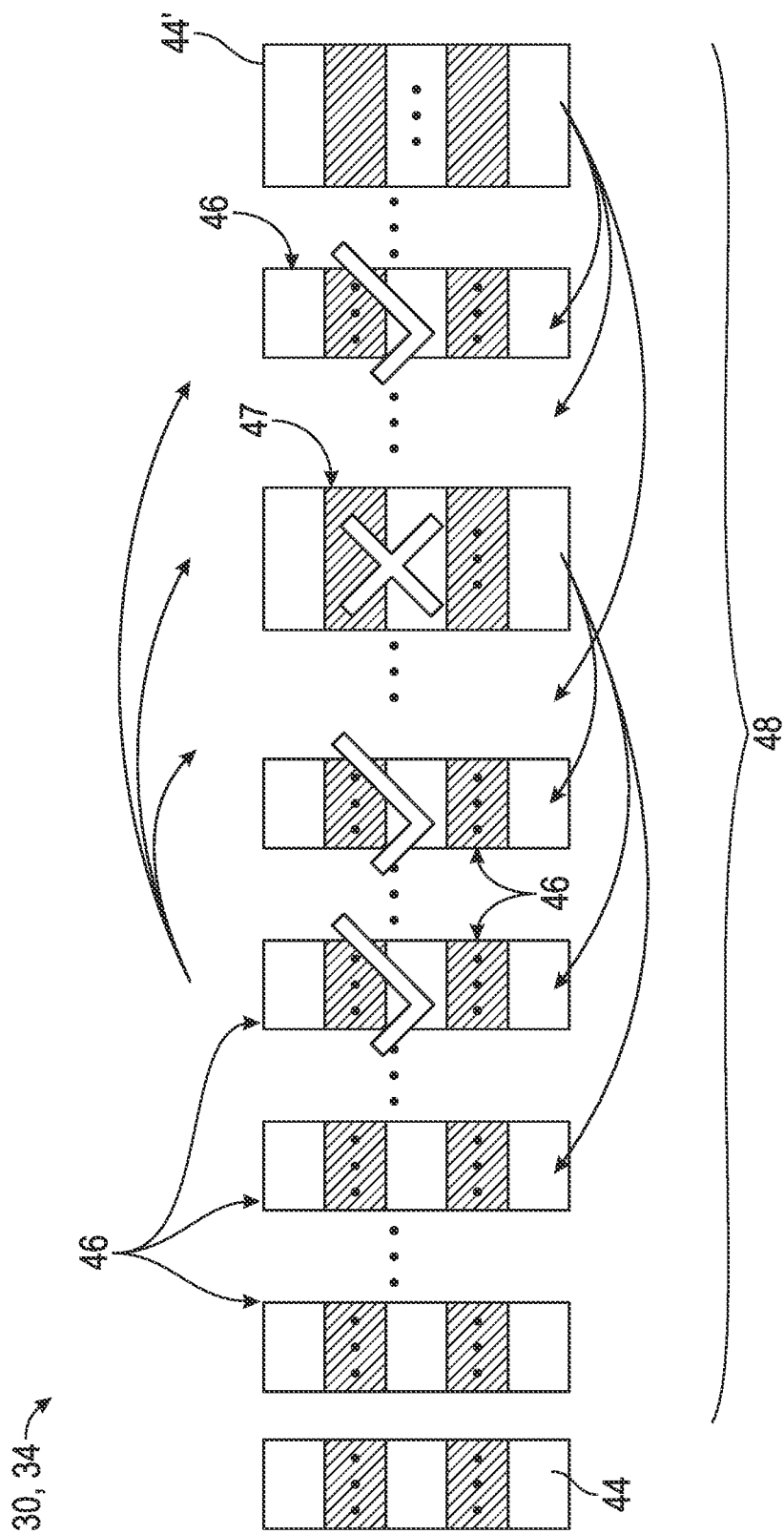
FIG. 3 is a graphical representation of a series of V2X messages transmitted during a single exemplary signing period of the system for enhancing efficiency of secure V2X stream communication according to an exemplary embodiment.

Turning now to FIG. 3 and with continuing reference to FIGS. 1 and 2, the CPA approach 34 is shown in further detail as a series of signed data packets 44 and a series of unsigned data packets 46. The signed data packets 44 are directly or explicitly authenticated, while unsigned data packets 46 are indirectly or implicitly authenticated. Utilizing the CPA approach 34, the EVSC 30 causes the receiving vehicle 12 to receive both signed and unsigned packets 44, 46 and store the packets in a buffer in memory 22 of the controller 18. More specifically, the EVSC 30 expects signed packets 44 to arrive on a scheduled, periodic basis, such as once every 100 milliseconds or at a 10 Hz frequency. Between signed packets 44, a plurality of unsigned packets 46 may be received. Upon receipt of a subsequent signed packet 44', the EVSC 30 verifies preceding unsigned packets 46 in a batched procedure based on a valid signature or certificate of the subsequent signed packet 44'. By only verifying preceding unsigned packets 46 upon receipt of a subsequent signed packet 44', the potential loss of an intermediate unsigned packet 46, i.e. an unsigned packet 46 that should have been received in the interval between the signed packet 44 and subsequent signed packet 44', but was not received, does not impact the ability of the EVSC 30 to verify all signed or unsigned packets 44, 46 preceding the subsequent signed packet 44'.

More specifically, a first signed packet 44 (otherwise denoted as $SigPac_{j-1}$) defines the end of a previous signing period (not specifically shown), and the beginning of a signing period or interval 48 starting with packet $P_{i-w}$. Intermediate unsigned packets 46 (otherwise denoted as $P_{i-w}, P_{i-k_2}, P_{i-k_1}, \ldots P_i, \ldots P_{j-1}$) are received by the system 10 prior to receipt of the subsequent signed packet 44' (otherwise indicated as $SigPac_j$). As shown in FIG. 3, the loss of intermediate unsigned packet 46 $P_i$ does not affect signature verification of other unsigned packets 46 because the hashes $H(P_{j-l})$ included in $P_i$ are recoverable from data contained in other unsigned packets 46. That is, each hash $H(P_{j-l})$ is embedded in a subset of packets between $P_{j-l}$ and $P_{j-1}$.

In several aspects, the CPA 34 approach causes transmitting vehicles 12', 12" to append the hash of packet $P_i$ to d subsequent packets. A location of the subsequent unsigned packets 46 may be static or randomized by a seed value shared with receiving vehicles 12. The seed value may be changed at random, periodically, or the like. In some examples, the seed value may be based upon a date or time stamp. A seeded hash function may then be used to determine an index of the $j^{th}$ packet where the hash of packet $P_i$ will be stored. In equation form, this may be represented by:

$$Loc_{i,j} = H(\text{seed}, i)[j], 1 \le j \le d \qquad 1.$$

The hash is then appended to multiple subsequent unsigned packets 46 to enable signature verification even if one or more of the subsequent unsigned packets 46 is lost 47. Hashes of subsequent unsigned packets 46 are in turn appended to other subsequent unsigned packets 46 and eventually to the subsequent signed packet 44'. As a result, the subsequent signed packet 44' provides for the EVSC 30 utilizing the CPA 34 approach to batch authenticate messages or packets within the signature period or window.

In several aspects, the signature verification process may be further described as a series of sequential steps starting with the verification of a signed packet 44'. When the signature on the signed packet 44' is valid, the signature verification for other packets 44 in the signing period 48 proceeds as follows. For every hash $H(P_{j-l})$ in the signed packet 44, the CPA 34 approach of the EVSC 30 causes the controller 18 to verify that the hash $H(P_{j-l})$ matches the corresponding buffered packet $P_{j-l}$. For every hash $H(P_{j-k})$ in an unsigned packet 46, the CPA 34 approach of the EVSC 30 causes the controller 18 to verify that the hash $H(P_{j-k})$ in the unsigned packet 46 matches the corresponding buffered packet $P_{j-k}$. The process of hash verification is recursively and continuously repeated until a first unsigned packet $P_{i\_w}$ in the signature period 48 or window is reached, or until the signed packet 44' of the previous signature period (not specifically shown) is reached. In some aspects, an index of linked packets, if not static, defines a re-generating random walk. Furthermore, due to redundancy introduced in the hash verification process, the same unsigned packet 46 is referenced through its hash in multiple other unsigned packets 46. However, despite the redundancy, signed and unsigned packets 44, 44', 46 are only verified once. In another embodiment, a signed packet 44 can be referenced, through its hash, in multiple unsigned packets 46 in the immediately subsequent signing period 48.

In several aspects, the EVSC 30 may actively and continuously utilize one or the other, or both of the SSA 32 and CPA 34 to manage V2X stream authentication. That is, the EVSC 30 monitors bandwidth utilization, computational resource utilization, and determines which of the SSA 32 and the CPA 34 has more effectively managed the consumption of bandwidth and computational resources. The EVSC 30 may also adapt the manner in which the SSA 32 approach is utilized by adjusting or increasing the ASIL threshold value being used, within predefined limits based on current traffic, before transitioning to use of the CPA 34. However, in some examples, the system 10 may turn to the CPA 34 approach first, before switching to or using the SSA 32 approach depending on vehicle 12 traffic as determined by a quantity of V2X messages being transmitted and received, and the like. In some respects, the SSA 32 approach offers advantages over the CPA 34 approach in that the SSA 32 approach does not require the buffering of messages as is the case in the CPA 34 approach. However, when a quantity of V2X messages being transmitted and received is above a predetermined threshold, the EVSC 30 will switch to using the CPA 34 approach, and when a quantity of V2X messages subsequently decreases, the EVSC 30 reverts to the SSA 32 approach. In further examples, the EVSC 30 may utilize both the SSA 32 and CPA 34 approaches in parallel by using the SSA 32 approach for messages identified as urgent or safety critical and which should not be delayed until the end of a signing period 48, and utilizing the CPA 34 approach for messages identified as non-urgent. That is, when messages are non safety-critical, or non-urgent, the non safety-critical, non-urgent messages remain un-secured.

In the foregoing, it should be appreciated that while the transmitter has been identified as a transmitting vehicle 12', 12", that the transmitter need not be a vehicle 12. That is, V2X messages may originate from infrastructure such as traffic signaling devices, vehicles 12, satellites 17, or the like without departing from the scope or intent of the present disclosure. Likewise, the receiver has been described as a receiving vehicle 12, however the receiver need not be a vehicle 12. The V2X messages may be received by vehicles 12, satellites 17, infrastructure such as traffic signaling devices, or the like as well.

Figure 4:
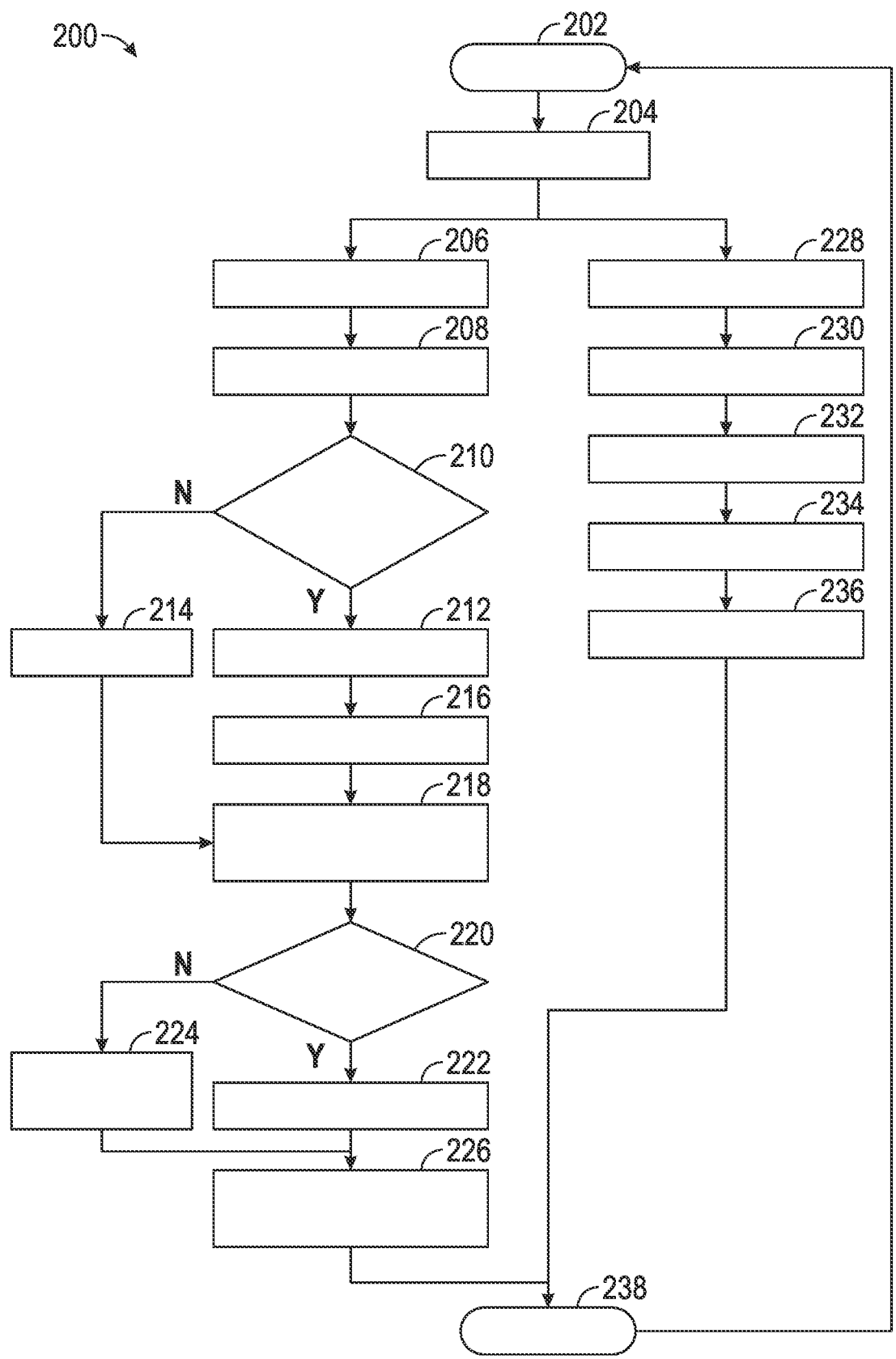
FIG. 4 is a flowchart depicting a method for enhancing efficiency of secure V2X stream communication according to an exemplary embodiment.

Turning now to FIG. 4 a method 200 for efficient V2X stream authentication is shown in flowchart form. The method 200 begins at block 202. At block 204, the system 10 captures, via the one or more sensors 31, vehicle 12 telematics information, speed, location, altitude, bandwidth utilization, computational resource utilization information, and the like about one or more transmitting vehicles 12', 12" and one or more receiving vehicles 12. The system 10 also captures environmental information about an area surrounding at least the receiving vehicle 12 by obtaining traffic information, road condition and road surface information, weather information, and position information from sensors 31 on infrastructure including global positioning system (GPS) satellites 17, cellular towers 16, and/or traffic signaling devices.

At block 204, the method engages the EVSC 30. At block 206, the EVSC 30 engages the SSA portion 32 to identify regular V2X messages including: vehicle heading, vehicle speed, vehicle location, and vehicle altitude, and to identify intermediate V2X messages including messages from autonomous applications including advanced driver assistance system (ADAS) communications. At block 208, the SSA portion 32 securely signs the regular V2X messages. At block 210, the SSA portion 32 determines whether intermediate V2X messages should be signed. More specifically, at block 210, the SSA portion 32 tracks behavior of transmitting vehicles 12', 12" and receiving vehicle 12 and continuously monitors the intermediate V2X messages for dramatic dynamic changes or special commands. At block 212, upon determining that a dramatic dynamic change or special command has occurred, the SSA portion 32 securely signs the intermediate V2X messages corresponding to the dramatic dynamic change or special command. By contrast, at block 214, upon determining that no dramatic change or special command has occurred, the SSA portion 32 does not sign the intermediate V2X messages.

At block 216, the SSA portion 32 tracks and generates predictions of transmitting vehicles 12', 12" since a previous securely signed V2X message was received. At block 218, upon receiving an unsecured V2X message, the SSA portion 32 compares the information contained in the unsecured V2X message to the information to the predictions.

At block 220, the SSA portion determines whether the unsecured V2X message matches the predictions. At block 222, upon determining that the unsecured V2X message matches the predictions, the SSA portion 32 increases a confidence level from a first level to a second level greater than the first level, and with the increased confidence level or trust in the sending vehicle 12', 12", the receiving vehicle may relax security requirements for messages received from the sending vehicles 12', 12" that sent the messages with increased confidence level. For example, instead of requiring signatures for V2X messages rated greater than or equal to a threshold ASIL rating such as ASIL B, the SSA portion 32 may decrease the threshold ASIL rating to require signatures only for messages rated ASIL C and above, or the like. By contrast, at block 224, when the unsecured V2X message does not match the prediction closely, then the SSA portion 32 does not increase the confidence level.

At block 226 the threshold ASIL rating is dynamically and continuously modified based on vehicle information about the transmitting vehicles 12', 12" and the receiving vehicles 12 and environmental information including: traffic information, road condition and road surface information, weather information, and position information and the like.

At block 228, which may be executed simultaneously and/or sequentially with the SSA portion 32 at block 204, the method 200 engages the CPA portion 34. At block 230, the CPA portion 34 buffers unsigned intermediate V2X messages that are received between a signed regular V2X message and a signed subsequent regular V2X message. At block 232, transmitting vehicles 12', 12" append a hash of each V2X message to subsequent V2X messages within a signing period or interval 48 between the signed regular V2X message and signed subsequent regular V2X message. At block 234, the CPA portion 34 verifies unsigned intermediate V2X messages based on a valid signature of the subsequent regular V2X message and a hash of the signed subsequent regular V2X message. At block 236, the CPA portion 34 batch authenticates one or more unsigned V2X messages in the interval via the hashes embedded in the signed subsequent regular V2X message.

At block 238, the method 200 ends and returns to block 202 where the method 200 runs again. It will be appreciated that the method 200 may run continuously, iteratively, recursively, or the like without departing from the scope or intent of the present disclosure. Furthermore, it should be appreciated that the method 200 actively and continuously engages the EVSC 30 to monitor bandwidth utilization and computational resource utilization and actively and continuously reduces bandwidth and computational resource utilization while ensuring security of V2X communications between a sending vehicle 12', 12" and a receiving vehicle 12' while the receiving vehicle is in operation. Specifically, the method 200 may execute the SSA portion 32 and CPA portion 34 separately, simultaneously, or in a manner in which the SSA portion 32 and CPA portion 34 are used dynamically to adjust to a quantity of V2X messages being transmitted and received within a predefined time period. In another embodiment, the methods described herein may also be used to secure communications between a vehicle 12 and a road-side unit, between multiple road-side units, or the like. For example, the methods described herein may be used to secure communications of safety-critical information about road traffic, road construction work, road congestion, or the like between road-side unit infrastructure components rather than, or in addition to vehicles 12 with which the road-side units may communicate.

A system and method for efficient V2X stream authentication of the present disclosure offers several advantages. These include improved efficiency through decreased utilization of computational resources and network bandwidth. In some examples, the efficiency may be further improved by restricting verification to signed and unsigned packets 44, 44', 46 that carry safety critical information, i.e. information having an ASIL rating greater than or equal to the predetermined threshold. Further, to decrease memory 22 utilization in buffering processes, the signing period 48 may be varied in duration from 100 milliseconds to other durations, such as 25 milliseconds, 50 milliseconds, or the like. In further examples, the buffering process may be made more efficient by limiting how far backwards the EVSC 30 and CPA 34 approach may look to find a last received signed packet 44. In further aspects, the randomized location of the packet hash reduces a likelihood of all replicated hashes being lost, and the inclusion of packet $P_i$'s hash in multiple packets mitigates the potential for packet loss that could otherwise prevent authentication of the $i^{th}$ packet. In addition, the batch authentication of packets is possible via the EVSC 30 and CPA 34 without increasing a quantity of required signatures or a frequency of signed packets 44, 44'. Packet chaining utilizing the CPA 34 approach offers further advantages, such as maintaining or even improving bandwidth efficiency through the use of truncated hashes. Likewise, computational overhead for transmitting vehicles 12', 12" is minimized because the same hash information is buffered and appended to subsequent packets transmitted. Similarly, computational overhead on behalf of the receiving vehicle 12 is minimized because packets are verified once, despite replicated hashes, and only a single signature is used. Memory 22 utilization is also reduced by limiting a signing period 48s to a predetermined length or restricting verification to safety critical messages only. Through use of the CPA 34 approach, V2X communications are efficiently enabled without requiring additional or new hardware or substantial changes to V2X communications patterns.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for enhancing efficient of vehicle to everything (V2X) stream communication comprises:
   one or more transmitting vehicles and one or more receiving vehicles;
   one or more sensors capturing vehicle information about the transmitting vehicles and the receiving vehicles and capturing environmental information about an environment of the one or more transmitting vehicles and the one or more receiving vehicles; and
   wherein each of the one or more transmitting vehicles and the one or more receiving vehicles have a controller, the controller including a processor, a memory, and one or more input/output (I/O) ports, the I/O ports in communication with the one or more sensors; the memory storing programmatic control logic; the processor executing the programmatic control logic; the programmatic control logic including an application for enhancing V2X stream communication (EVSC), the EVSC comprising:
   a first control logic for obtaining, from the one or more sensors, transmitting and receiving vehicle information and environmental information;
   a second control logic for engaging a sparse signing approach (SSA) portion of the EVSC;
   a third control logic for engaging a chained packet approach (CPA) portion of the EVSC; and
   a fourth control logic for actively and continuously engaging the SSA and CPA portions to monitor bandwidth utilization and computational resource utilization and to actively and continuously reduce bandwidth and computational resource utilization from a first level to a second level less than the first level while ensuring security of V2X communications.

2. The system of claim 1, wherein the first control logic further comprises:
   obtaining vehicle telematics information including speed, location, altitude, bandwidth utilization, computational resource utilization from sensors comprising: sensors disposed on the one or more transmitting vehicles and on the one or more receiving vehicles; and
   obtaining traffic information, road condition and road surface information, weather information, and position information from sensors comprising: sensors on infrastructure including global positioning system (GPS) satellites, cellular towers, and traffic signaling devices.

3. The system of claim 2, wherein the second control logic further comprises:
   identifying regular V2X messages including: vehicle heading, vehicle speed, vehicle location, and vehicle altitude; and
   identifying intermediate V2X messages including messages from autonomous applications including advanced driver assistance system (ADAS) communications.

4. The system of claim 3, wherein regular V2X messages are sent and received on a standard message interval that is regular and periodic, wherein intermediate messages are sent and received at a higher frequency than the standard message interval.

5. The system of claim 3, further comprising:
   securely signing regular V2X messages; and
   selectively signing intermediate V2X messages by:
      tracking behavior of transmitting vehicles and receiving vehicles by actively and continuously monitoring the intermediate V2X messages; and
      upon determining that a dramatic dynamic change is occurring or that a special command has been sent, securely signing the intermediate V2X messages corresponding to the dramatic dynamic change or the special command.

6. The system of claim 3 wherein the second control logic further comprises:
   control logic that causes receiving vehicles to track and generate predictions of transmitting vehicles since a previous securely signed V2X message was received;
   upon receiving an unsecured V2X message, verifying the information contained in the unsecured V2X message by comparing the information in the unsecured V2X message to the predictions; and
   upon determining that the unsecured V2X message matches the predictions, increasing a confidence level from a first level to a second level greater than the first level, and wherein confidence levels define automotive safety integrity level (ASIL) ratings, and wherein the receiving vehicle signs and secures unsecured V2X messages having ASIL ratings equal to or greater than a threshold ASIL rating.

7. The system of claim 6, wherein a baseline threshold ASIL rating is ASIL-B; and the threshold ASIL rating is selectively modified based on vehicle information about the transmitting vehicles and the receiving vehicles and environmental information including: traffic information, road condition and road surface information, weather information, and position information.

8. The system of claim 3, wherein the third control logic further comprises:
   control logic that causes receiving vehicles to buffer unsigned intermediate V2X messages that are received between a signed regular V2X message and a signed subsequent regular V2X message; and control logic that causes transmitting vehicles to append a hash of each V2X message to subsequent V2X messages within an interval between the signed regular V2X message and signed subsequent regular V2X message.

9. The system of claim 8, further comprising:

control logic that verifies unsigned intermediate V2X messages based on a valid signature of the subsequent regular V2X message and a hash of the signed subsequent regular V2X message; and batch authenticating one or more unsigned V2X messages in the interval via the hash of the signed subsequent regular V2X message.

10. The system of claim 2, wherein the EVSC operates actively and continuously while the receiving vehicle is in operation; and wherein the SSA and CPA portions run selectively to actively and continuously reduce bandwidth and computational resource utilization from the first level to the second level by:

executing control logic to operate the SSA when a quantity of V2X messages being transmitted and received within a predefined period of time is equal to or below a predetermined threshold quantity; and executing control logic to operate the CPA while the quantity of V2X messages being transmitted and received within the predefined period of time is greater than the predetermined threshold quantity.

11. The system of claim 2, wherein the EVSC operates actively and continuously while the receiving vehicle is in operation; and wherein the SSA and CPA portions run selectively to actively and continuously reduce bandwidth and computational resource utilization from the first level to the second level by:

executing control logic to operate the SSA portion to manage V2X messages identified as urgent through the ASIL ratings of the V2X messages being transmitted and received within a predefined period of time; and executing control logic to operate the CPA portion to manage V2X messages identified as non-urgent via the ASIL ratings of the V2X messages being transmitted and received within the predefined period of time.

12. A method for enhancing efficient of vehicle to everything (V2X) stream communication comprises:

capturing, via one or more sensors, vehicle information about one or more transmitting vehicles and one or more receiving vehicles, and capturing environmental information about an environment of the one or more transmitting vehicles and the one or more receiving vehicles, wherein each of the one or more transmitting vehicles and the one or more receiving vehicles have a controller, the controller including a processor, a memory, and one or more input/output (I/O) ports, the I/O ports in communication with the one or more sensors; the memory storing programmatic control logic; the processor executing the programmatic control logic; the programmatic control logic including an application for enhancing V2X stream communication (EVSC), the EVSC comprising control logic for:

obtaining, from the one or more sensors, transmitting and receiving vehicle information and environmental information;

engaging a sparse signing approach (SSA) portion of the EVSC;

engaging a chained packet approach (CPA) portion of the EVSC; and actively and continuously engaging the SSA and CPA portions to monitor bandwidth utilization and computational resource utilization and actively and continuously reducing bandwidth and computational resource utilization from a first level to a second level less than the first level while ensuring security of V2X communications.

13. The method of claim 12, further comprising:

obtaining vehicle telematics information including speed, location, altitude, bandwidth utilization, computational resource utilization from sensors comprising: sensors disposed on the one or more transmitting vehicles and on the one or more receiving vehicles; and obtaining traffic information, road condition and road surface information, weather information, and position information from sensors comprising: sensors on infrastructure including global positioning system (GPS) satellites, cellular towers, and traffic signaling devices.

14. The method of claim 13, further comprising:

identifying regular V2X messages including: vehicle heading, vehicle speed, vehicle location, and vehicle altitude;

identifying intermediate V2X messages including messages from autonomous applications including advanced driver assistance system (ADAS) communications; and sending and receiving regular V2X messages on a standard message interval that is regular and periodic, and sending and receiving intermediate V2X messages at a higher frequency than the standard message interval.

15. The method of claim 14, further comprising:

securely signing regular V2X messages; and selectively securely signing intermediate V2X messages by:

tracking behavior of transmitting vehicles and receiving vehicles by actively and continuously monitoring the intermediate V2X messages; and upon determining that a dramatic dynamic change is occurring or that a special command has been sent, securely signing the intermediate V2X messages corresponding to the dramatic dynamic change or the special command.

16. The method of claim 14, further comprising:

causing receiving vehicles to track and generate predictions of transmitting vehicles since a previous securely signed V2X message was received;

upon receiving an unsecured V2X message, verifying the information contained in the unsecured V2X message by comparing the information in the unsecured V2X message to the predictions; and upon determining that the unsecured V2X message matches the predictions, increasing a confidence level from a first level to a second level greater than the first level, and wherein confidence levels define automotive safety integrity level (ASIL) ratings, and wherein the receiving vehicle signs and secures unsecured V2X messages having ASIL ratings equal to or greater than a threshold ASIL rating, wherein a baseline threshold ASIL rating is ASIL B; and selectively modifying the threshold ASIL rating based on vehicle information about the transmitting vehicles and the receiving vehicles and environmental information including: traffic information, road condition and road surface information, weather information, and position information.

17. The method of claim 14, further comprising:
causing receiving vehicles to buffer unsigned intermediate V2X messages that are received between a signed regular V2X message and a signed subsequent regular V2X message; and
causing transmitting vehicles to append a hash of each V2X message to subsequent V2X messages within an interval between the signed regular V2X message and signed subsequent regular V2X message;
verifying unsigned intermediate V2X messages based on a valid signature of the subsequent regular V2X message and a hash of the signed subsequent regular V2X message; and
batch authenticating one or more unsigned V2X messages in the interval via the hash of the signed subsequent regular V2X message.

18. The method of claim 13, further comprising:
operating the EVSC actively and continuously while the receiving vehicle is in operation; and
selectively running the SSA and CPA portions to actively and continuously reduce bandwidth and computational resource utilization from the first level to the second level by:
executing the SSA when a quantity of V2X messages being transmitted and received within a predefined period of time is equal to or below a predetermined threshold quantity; and
executing the CPA while the quantity of V2X messages being transmitted and received within the predefined period of time is greater than the predetermined threshold quantity.

19. The method of claim 13, further comprising:
operating the EVSC actively and continuously while the receiving vehicle is in operation; and
selectively running the SSA and CPA portions to actively and continuously reduce bandwidth and computational resource utilization from the first level to the second level by:
executing the SSA portion to manage V2X messages identified as urgent through the ASIL ratings of the V2X messages being transmitted and received within a predefined period of time; and
executing the CPA portion to manage V2X messages identified as non-urgent via the ASIL ratings of the V2X messages being transmitted and received within the predefined period of time.

20. A method for enhancing efficient of vehicle to everything (V2X) stream communication comprises:
capturing, via one or more sensors, vehicle information about one or more transmitting vehicles and one or more receiving vehicles, and capturing environmental information about an environment of the one or more transmitting vehicles and the one or more receiving vehicles, wherein each of the one or more transmitting vehicles and the one or more receiving vehicles have a controller, the controller including a processor, a memory, and one or more input/output (I/O) ports, the I/O ports in communication with the one or more sensors; the memory storing programmatic control logic; the processor executing the programmatic control logic; the programmatic control logic including an application for enhancing V2X stream communication (EVSC), the EVSC comprising control logic for:
obtaining, from the one or more sensors, vehicle telematics information including speed, location, altitude, bandwidth utilization, computational resource utilization from sensors comprising: sensors disposed on the one or more transmitting vehicles and on the one or more receiving vehicles; and
obtaining traffic information, road condition and road surface information, weather information, and position information from sensors comprising: sensors on infrastructure including global positioning system (GPS) satellites, cellular towers, and traffic signaling devices;
engaging a sparse signing approach (SSA) portion of the EVSC, including:
identifying regular V2X messages including: vehicle heading, vehicle speed, vehicle location, and vehicle altitude;
identifying intermediate V2X messages including messages from autonomous applications including advanced driver assistance system (ADAS) communications;
sending and receiving regular V2X messages on a standard message interval that is regular and periodic, and sending and receiving intermediate V2X messages at a higher frequency than the standard message interval;
securely signing regular V2X messages;
selectively securely signing intermediate V2X messages by:
tracking behavior of transmitting vehicles and receiving vehicles by actively and continuously monitoring the intermediate V2X messages; and
upon determining that a dramatic dynamic change is occurring or that a special command has been sent, securely signing the intermediate V2X messages corresponding to the dramatic dynamic change or the special command;
causing receiving vehicles to track and generate predictions of transmitting vehicles since a previous securely signed V2X message was received;
upon receiving an unsecured V2X message, verifying the information contained in the unsecured V2X message by comparing the information in the unsecured V2X message to the predictions;
upon determining that the unsecured V2X message matches the predictions, increasing a confidence level from a first level to a second level greater than the first level, and wherein confidence levels define automotive safety integrity level (ASIL) ratings, and wherein the receiving vehicle signs and secures unsecured V2X messages having ASIL ratings equal to or greater than a threshold ASIL rating, wherein a baseline threshold ASIL rating is ASIL B; and
selectively modifying the threshold ASIL rating based on vehicle information about the transmitting vehicles and the receiving vehicles and environmental information including: traffic information, road condition and road surface information, weather information, and position information;
engaging a chained packet approach (CPA) portion of the EVSC, including:
causing receiving vehicles to buffer unsigned intermediate V2X messages that are received between a signed regular V2X message and a signed subsequent regular V2X message;
causing transmitting vehicles to append a hash of each V2X message to subsequent V2X messages within an interval between the signed regular V2X message and signed subsequent regular V2X message;

verifying unsigned intermediate V2X messages based on a valid signature of the subsequent regular V2X message and a hash of the signed subsequent regular V2X message;

batch authenticating one or more unsigned V2X messages in the interval via the hash of the signed subsequent regular V2X message; and actively and continuously engaging the EVSC to monitor bandwidth utilization and computational resource utilization and actively and continuously reducing bandwidth and computational resource utilization while ensuring security of V2X communications while the receiving vehicle is in operation by:

selectively running the SSA and CPA portions to actively and continuously reduce bandwidth and computational resource utilization from a first level to the second level less than the first level by:

executing the SSA when a quantity of V2X messages being transmitted and received within a predefined period of time is equal to or below a predetermined threshold quantity;

executing the CPA while the quantity of V2X messages being transmitted and received within the predefined period of time is greater than the predetermined threshold quantity; and selectively running the SSA and CPA portions to actively and continuously reduce bandwidth and computational resource utilization from the first level to the second level by:

executing the SSA portion to manage V2X messages identified as urgent through the ASIL ratings of the V2X messages being transmitted and received within a predefined period of time; and executing the CPA portion to manage V2X messages identified as non-urgent via the ASIL ratings of the V2X messages being transmitted and received within the predefined period of time.

* * * * *